(12) United States Patent
Atsumi

(10) Patent No.: US 12,007,743 B2
(45) Date of Patent: Jun. 11, 2024

(54) MONITORING SYSTEM FOR MATCHING AN OPERATOR WITH A SEWING MACHINE ON THE FLOOR OF A SEWING FACTORY

(71) Applicant: JUKI CORPORATION, Tama (JP)

(72) Inventor: Tadashi Atsumi, Tama (JP)

(73) Assignee: JUKI CORPORATION, Tama (JP)

( * ) Notice: Subject to any disclaimer, the term of this patent is extended or adjusted under 35 U.S.C. 154(b) by 0 days.

(21) Appl. No.: 16/701,318

(22) Filed: Dec. 3, 2019

(65) Prior Publication Data

US 2020/0183354 A1 Jun. 11, 2020

(30) Foreign Application Priority Data

Dec. 5, 2018 (JP) ................................. 2018-228157

(51) Int. Cl.
*G05B 19/4063* (2006.01)
*G05B 19/418* (2006.01)

(52) U.S. Cl.
CPC ..... *G05B 19/4063* (2013.01); *G05B 19/4183* (2013.01); *G05B 2219/32286* (2013.01); *G05B 2219/45195* (2013.01)

(58) Field of Classification Search
CPC ............ G05B 19/4063; G05B 19/4183; G05B 19/41875; G05B 2219/45195; G05B 2219/32286; G05B 23/00; G06Q 10/00; G06Q 10/0631; G06Q 10/0833; G06Q 50/04; Y02P 90/02; Y02P 90/30; D05B 19/00; D05B 25/00; D05D 2205/00; D05D 2205/16; D05D 2205/18
See application file for complete search history.

(56) References Cited

U.S. PATENT DOCUMENTS 5,140,537 A * 8/1992 Tullis ............... G05B 19/41885
705/7.14
5,311,438 A 5/1994 Sellers et al.
(Continued)

FOREIGN PATENT DOCUMENTS

| CN | 104646565 A | 5/2015 |
| CN | 105424716 A | 3/2016 |

(Continued)

OTHER PUBLICATIONS

T. Yurtsever, Ying Chan and N. G. Pierce, "Graphical manufacturing monitoring system," 1997 IEEE/SEMI Advanced Semiconductor Manufacturing Conference and Workshop ASMC 97 Proceedings, 1997, pp. 156-161, doi: 10.1109/ASMC.1997.630725. (Year: 1997).*

(Continued)

*Primary Examiner* — M. N. Von Buhr
(74) *Attorney, Agent, or Firm* — Faegre Drinker Biddle & Reath LLP

(57) ABSTRACT

The present embodiment provide a monitoring system for monitoring at least one of fixed equipment installed in a floor and a moving object moving in the floor, the fixed equipment and moving object being monitoring targets, the monitoring system includes a recognition device that recognizes the monitoring target and outputs recognition information, and a management device that collects position information of the monitoring target from the recognition information.

9 Claims, 7 Drawing Sheets

(56) References Cited

U.S. PATENT DOCUMENTS

| | | | | |
|---|---|---|---|---|
| 6,336,053 | B1* | 1/2002 | Beatty | G05B 19/4188 |
| | | | | 700/108 |
| 6,396,516 | B1* | 5/2002 | Beatty | G06Q 10/06 |
| | | | | 715/764 |
| 6,523,045 | B1* | 2/2003 | Beatty | G06Q 10/04 |
| 7,518,511 | B1* | 4/2009 | Panja | G06Q 10/08 |
| | | | | 340/572.1 |
| 8,108,790 | B2 | 1/2012 | Morrison, Jr. | G05B 23/0272 |
| | | | | 715/965 |
| 8,548,838 | B1* | 10/2013 | Ganesan | G06Q 10/06311 |
| | | | | 705/7.22 |
| 8,762,105 | B2* | 6/2014 | Fujiwara | F16T 1/48 |
| | | | | 702/184 |
| 8,886,553 | B2* | 11/2014 | Greef | G05B 19/409 |
| | | | | 705/7.11 |
| 9,557,735 | B2* | 1/2017 | Firkins | G05B 23/027 |
| 10,409,450 | B2* | 9/2019 | Gilger | G06F 9/451 |
| 10,735,691 | B2* | 8/2020 | Schmirler | H04N 7/181 |
| 10,809,901 | B2* | 10/2020 | Bear | G06Q 10/00 |
| 11,068,812 | B2* | 7/2021 | Tsuzuki | G06Q 10/06398 |
| 11,262,726 | B2* | 3/2022 | Emmenegger | G05B 19/4063 |
| 2002/0069131 | A1* | 6/2002 | Miyata | G06Q 30/02 |
| | | | | 705/26.9 |
| 2003/0150909 | A1* | 8/2003 | Markham | G06Q 50/00 |
| | | | | 235/376 |
| 2006/0027404 | A1* | 2/2006 | Foxlin | G01C 21/16 |
| | | | | 178/18.06 |
| 2009/0043504 | A1* | 2/2009 | Bandyopadhyay | G01S 19/48 |
| | | | | 701/469 |
| 2009/0065578 | A1* | 3/2009 | Peterson | G05B 19/409 |
| | | | | 235/382 |
| 2009/0216341 | A1* | 8/2009 | Enkerud | G05B 19/042 |
| | | | | 700/83 |
| 2010/0326472 | A1* | 12/2010 | Glenn | G08B 21/245 |
| | | | | 134/18 |
| 2011/0071971 | A1* | 3/2011 | Parks | G06N 5/02 |
| | | | | 706/45 |
| 2011/0246455 | A1* | 10/2011 | Itoh | G06F 16/951 |
| | | | | 707/E17.069 |
| 2012/0232942 | A1* | 9/2012 | Gaug | G06Q 10/08 |
| | | | | 705/7.12 |
| 2013/0157691 | A1* | 6/2013 | Beydler | G08B 21/028 |
| | | | | 455/456.2 |
| 2014/0111520 | A1* | 4/2014 | Cline | G06T 11/60 |
| | | | | 345/440 |
| 2014/0350717 | A1* | 11/2014 | Dagle | B65G 1/1373 |
| | | | | 700/216 |
| 2014/0357295 | A1* | 12/2014 | Skomra | G08G 1/202 |
| | | | | 455/456.1 |
| 2016/0012361 | A1* | 1/2016 | Sugiyama | H04N 21/4147 |
| | | | | 705/7.38 |
| 2016/0090097 | A1* | 3/2016 | Grube | B60W 40/08 |
| | | | | 340/576 |
| 2016/0110984 | A1* | 4/2016 | Seol | F16P 3/147 |
| | | | | 340/539.13 |
| 2016/0125757 | A1* | 5/2016 | Maenishi | G09B 5/02 |
| | | | | 700/121 |
| 2016/0257310 | A1* | 9/2016 | Sprock | G06Q 50/08 |
| 2016/0266576 | A1* | 9/2016 | Ayabakan | G05B 23/0216 |
| 2017/0147958 | A1* | 5/2017 | Hatfield | G06Q 10/063114 |
| 2017/0228891 | A1* | 8/2017 | Ward | G06T 7/74 |
| 2017/0243034 | A1 | 8/2017 | Ben-Bassat et al. | |
| 2017/0261968 | A1* | 9/2017 | Kobayashi | H05K 13/00 |
| 2017/0316482 | A1* | 11/2017 | Hisano | G06Q 30/06 |
| 2018/0018911 | A1* | 1/2018 | Kitagawa | G06F 3/04817 |
| 2018/0080782 | A1* | 3/2018 | Noda | G01C 21/3667 |
| 2018/0114414 | A1* | 4/2018 | Law | G05B 23/0272 |
| 2018/0249298 | A1* | 8/2018 | Jain | H04W 4/023 |
| 2018/0284735 | A1* | 10/2018 | Cella | G05B 19/4185 |
| 2018/0350144 | A1* | 12/2018 | Rathod | A63F 13/216 |
| 2018/0365619 | A1* | 12/2018 | Hardy | G06F 21/6254 |
| 2019/0034850 | A1* | 1/2019 | Ben-Bassat | G06K 7/1413 |
| 2019/0171187 | A1* | 6/2019 | Cella | G05B 23/0221 |
| 2020/0101612 | A1* | 4/2020 | Peterson | G05B 19/058 |
| 2020/0268261 | A1* | 8/2020 | Ikegami | H04W 4/70 |

FOREIGN PATENT DOCUMENTS

| | | |
|---|---|---|
| CN | 107870600 A | 4/2018 |
| EP | 2 924 524 A1 | 9/2015 |
| EP | 3 088 973 A1 | 11/2016 |
| JP | H04-283058 A | 10/1992 |
| JP | 2000-181953 A | 6/2000 |
| JP | 2005-346614 A | 12/2005 |
| JP | 2007-094924 A | 4/2007 |
| JP | 2009-157517 A | 7/2009 |
| JP | 2017-168652 A1 | 10/2017 |
| WO | WO-2018/158622 A1 | 9/2018 |

OTHER PUBLICATIONS

Y. Wang, G. He and L. Kong, "Research on collection of process data based on RFID technology for job-shop," 2010 International Conference on Logistics Systems and Intelligent Management (ICLSIM), 2010, pp. 451-455, doi: 10.1109/ICLSIM.2010. 5461382. (Year: 2010).*

Q. Gao, F. Li and C. Chen, "Research of Internet of Things applied to manufacturing execution system," 2015 IEEE International Conference on Cyber Technology in Automation, Control, and Intelligent Systems (CYBER), 2015, pp. 661-665, doi: 10.1109/CYBER. 2015.7288019. (Year: 2015).*

K. Ding and P. Jiang, "RFID-based production data analysis in an IoT-enabled smart job-shop," in IEEE/CAA Journal of Automatica Sinica, vol. 5, No. 1, pp. 128-138, Jan. 2018, doi: 10.1109/JAS. 2017.7510418. (Year: 2018).*

Japanese Office Action issued Sep. 20, 2022 in Japanese Patent Application No. 2018-228157.

Japanese Office Action issued Mar. 22, 2023 in Japanese Patent Application No. 2018-228157, with English-language translation.

First Office Action issued Jun. 8, 2023 in Chinese Application No. 201911233341.2.

Second Office Action issued Nov. 9, 2023 in Chinese Application No. 201911233341.2.

* cited by examiner

FIG.3

| | | | | | |
|---|---|---|---|---|---|
| MANUFAC-TURING EQUIPMENT | SERIAL NUMBER | POSITION | EQUIPMENT TYPE | OPERATING STATE | |
| | A0001 | $(X_1,Y_1)$ | CLOTH INSPECTION | ACTIVE | |
| | A0002 | $(X_2,Y_2)$ | SPREADING | ACTIVE | |
| | ⋮ | ⋮ | ⋮ | ⋮ | |
| | A0011 | $(X_3,Y_3)$ | SEWING MACHINE | ABNORMAL | |
| | ⋮ | ⋮ | ⋮ | ⋮ | |
| WORKER | EMPLOYEE NUMBER | POSITION | BUSINESS TYPE | PHYSICAL CONDITION | |
| | B0001 | $(X_4,Y_4)$ | MECHANIC | NORMAL | |
| | B0002 | $(X_5,Y_5)$ | OPERATOR | ABNORMAL | |
| | ⋮ | ⋮ | ⋮ | ⋮ | |
| MANUFAC-TURED ARTICLE | | POSITION | PRODUCT NUMBER | | QUANTITY |
| | | PROCESS A | PRODUCT NUMBER 1 | | 5 |
| | | PROCESS B | PRODUCT NUMBER 1 | | 5 |
| | | PROCESS C | PRODUCT NUMBER 1 | | 12 |
| | | ⋮ | ⋮ | | ⋮ |
| COMPUTER | SERIAL NUMBER | POSITION | | OPERATION STATE | |
| | C0001 | $(X_6,Y_6)$ | | BEING OPERATED | |
| | ⋮ | ⋮ | | ⋮ | |
| AGV | SERIAL NUMBER | POSITION | | OPERATION STATE | |
| | D0001 | $(X_7,Y_7)$ | | BEING OPERATED | |
| | D0002 | $(X_8,Y_8)$ | | BEING WAITED | |
| | ⋮ | ⋮ | | ⋮ | |
| TABLET TERMINAL | SERIAL NUMBER | POSITION | | USE STATUS | |
| | E0001 | $(X_9,Y_9)$ | | UNUSED | |
| | E0002 | $(X_{10},Y_{10})$ | | BEING USED | |
| | ⋮ | ⋮ | | ⋮ | |
| BULLETIN BOARD | SERIAL NUMBER | POSITION | | DISPLAY STATUS | |
| | F0001 | $(X_{11},Y_{11})$ | | BEING DISPLAYED | |
| | ⋮ | ⋮ | | ⋮ | |
| WORK TABLE | TABLE NUMBER | POSITION | | EMPTY STATUS | |
| | G0001 | $(X_{12},Y_{12})$ | | BEING USED | |
| | G0002 | $(X_{13},Y_{13})$ | | UNUSED | |
| MATERIALS AND LIKE | | | | | QUANTITY |
| CLOTH | | | | | X ROLLS |
| ⋮ | | | | | ⋮ |
| BUTTONS | | | | | Y BUTTONS |
| ⋮ | | | | | ⋮ |
| PRODUCT | | | | | Z ITEMS |
| ⋮ | | | | | ⋮ |

FIG.4

| | | | | |
|---|---|---|---|---|
| CLOTH INSPECTION EQUIPMENT | CLOTH INSPECTION | I1 | COMPUTER | I22 |
| SPREADING EQUIPMENT | SPREADING | I2 | WORK TABLE | WORK I23 |
| CUTTING EQUIPMENT | CUTTING | I3 | BULLETIN BOARD | I24 |
| SEWING EQUIPMENT | SEWING | I4 | AGV | I25 |
| FINISHING EQUIPMENT | FINISHING | I5 | TABLET TERMINAL | I26 |
| INSPECTION EQUIPMENT | INSPECTION | I6 | MATERIAL | I27 |
| PACKING EQUIPMENT | PACKING | I7 | AUXILIARY MATERIAL | I28 |
| SHIPPING EQUIPMENT | SHIPPING | I8 | PACKED PRODUCT | I29 |
| SEWING MACHINE | I9 | | | |
| OPERATOR | I10 | | | |
| MECHANIC | I11 | | | |
| LINE MANAGER | I12 | | | |
| MANUFACTURED ARTICLE | I21 | | STAGNANT | I30 |

  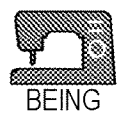 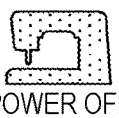 
POWER ON    ACTIVE    BEING STOPPED    POWER OFF    ABNORMAL

 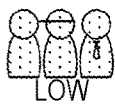  
NORMAL    LOW FATIGUE    HIGH FATIGUER    ABNORMAL

 
NORMAL    STAGNANT

MONITORING SYSTEM FOR MATCHING AN OPERATOR WITH A SEWING MACHINE ON THE FLOOR OF A SEWING FACTORY

CROSS-REFERENCE TO RELATED APPLICATIONS

The present application claims the benefit of priority of Japanese Patent Application No. 2018-228157, filed on Dec. 5, 2018, the content of which is incorporated herein by reference.

TECHNICAL FIELD

The present invention relates to a monitoring system for monitoring a monitoring target in a floor.

BACKGROUND ART

In the related art, a system for monitoring a status of a manufactured article in each process of a manufacturing line has been proposed (see, for example, JP-A-1992-283058). In the system described in JP-A-1992-283058, an ID plate is attached to the manufactured article or an automated guided vehicle on which the manufactured article is placed and appropriate processing is performed on the manufactured article using the ID plate in each process. For example, a processing content in each process is stored in the ID plate, and the processing content for the manufactured article is recognized by using the processing content read from the ID plate in each process. In addition, a trouble occurring in the line until the manufactured article is completed is written on the ID plate and used as analysis data.

However, in the system described in JP-A-1992-283058, the status of the manufacturing line and the manufactured article can be checked by the ID plate, but a status of the entire floor cannot be grasped.

SUMMARY OF INVENTION

The present invention has been made in view of such points, and an object of the present invention is to provide a monitoring system that can easily grasp a status of the entire floor.

An aspect of the present invention is a monitoring system for monitoring at least one of fixed equipment installed in a floor and a moving object moving in the floor, the fixed equipment and moving object being monitoring targets, the monitoring system comprises a recognition device that recognizes the monitoring target and outputs recognition information, and a management device that collects position information of the monitoring target from the recognition information.

According to this configuration, positions of the fixed equipment installed in the floor and the moving object that moves in the floor as monitoring targets are specified. Therefore, the status of the entire floor can be easily grasped from equipment layout in the floor, a moving status of the moving object, and the like.

In the monitoring system of the aspect of the present invention, the management device may include a position information acquisition unit that acquires the position information of the monitoring target from the recognition information, a type information acquisition unit that acquires type information of the monitoring target from the recognition information, and an information management unit that manages the position information and the type information in association with each other for each monitoring target. According to this configuration, it is possible to grasp the equipment layout in the floor, the moving status of the moving object, and the like for each type of the fixed equipment and moving object.

In the monitoring system of the aspect of the present invention, the management device may include a state information acquisition unit that acquires state information from the monitoring target, and manages the state information in association with the position information and the type information for each monitoring target. According to this configuration, in addition to the equipment layout in the floor and the moving status of the moving object for each type of the fixed equipment and moving object, it is possible to grasp an operation status of each fixed equipment and each moving object.

In the monitoring system of the aspect of the present invention, the fixed equipment including manufacturing equipment installed in the floor may be set as the monitoring target, and the management device may acquire an equipment type of the manufacturing equipment as the type information by the type information acquisition unit. According to this configuration, the equipment layout of the manufacturing equipment can be grasped for each equipment type.

In the monitoring system of the aspect of the present invention, the management device may acquire operating information indicating an operating state from the manufacturing equipment by the state information acquisition unit, and manages the operating information in association with the position information and the type information for each manufacturing equipment by the information management unit. According to this configuration, the operating state is associated with the equipment layout of the manufacturing equipment. For example, it is possible to grasp an installation place of the manufacturing equipment whose operating state is abnormal in the floor.

In the monitoring system of the aspect of the present invention, the moving object including a worker who walks around the floor may be set as the monitoring target, and the management device may acquire a business type of the worker as the type information by the type information acquisition unit. According to this configuration, it is possible to grasp a work status of a worker for each business type.

In the monitoring system of the aspect of the present invention, the management device may acquire physical condition information of the worker from a physical condition sensor by the state information acquisition unit, and manages the physical information in associated with the position information and the type information for each worker by the information management unit. According to this configuration, a physical condition of the worker is associated with a work place of the worker. For example, it is possible to grasp the work place of the worker whose physical condition is poor in the floor.

In the monitoring system of the aspect of the present invention, a manufacturing line may be constructed in the floor, and the moving object including a manufactured article transported on the manufacturing line may be set as the monitoring target, the recognition device may be a reader that reads a tag attached to the manufactured article and outputs tag information as the recognition information, and the management device may acquire, as position information, a process of the manufacturing line where the manufactured article exists from the tag information by the position information acquisition unit, and may manage a quantity of the manufactured article for each process of the manufacturing line by the information management unit. According to this configuration, it is possible to manage the quantity of manufactured articles in each process of the manufacturing line and grasp a stagnation point of the manufactured article in the manufacturing line.

In the monitoring system of the aspect of the present invention, the management device may include a map creation unit that creates a floor map in which an icon corresponding to the monitoring target is arranged at a position indicated by the position information. According to this configuration, since the floor map on which the icon of the monitoring target is displayed is automatically created, it is possible to intuitively grasp the monitoring target in the floor by visually recognizing the floor map.

In the monitoring system of the aspect of the present invention, the fixed equipment including the manufacturing equipment installed in the floor and the moving object including an operator working in the manufacturing equipment may be set as the monitoring target, and the management device may include a processing capability acquisition unit that acquires a processing capability of the operator using the manufacturing equipment, and a matching determination unit that determines matching between the processing capability of the manufacturing equipment and the processing capability of the operator. According to this configuration, it is possible to extract the processing capabilities of the manufacturing equipment and the operator from each other by allocating the manufacturing equipment having performance suitable for the skill of the operator.

According to the present invention, the status of the entire floor can be easily grasped by recognizing the monitoring target and collecting the position information of the monitoring target from the recognition information.

BRIEF DESCRIPTION OF DRAWINGS

FIG. 3 is an example of a management table according to the embodiment;

FIG. 4 is an example of an icon table according to the present embodiment;

DETAILED DESCRIPTION

Figure 1:
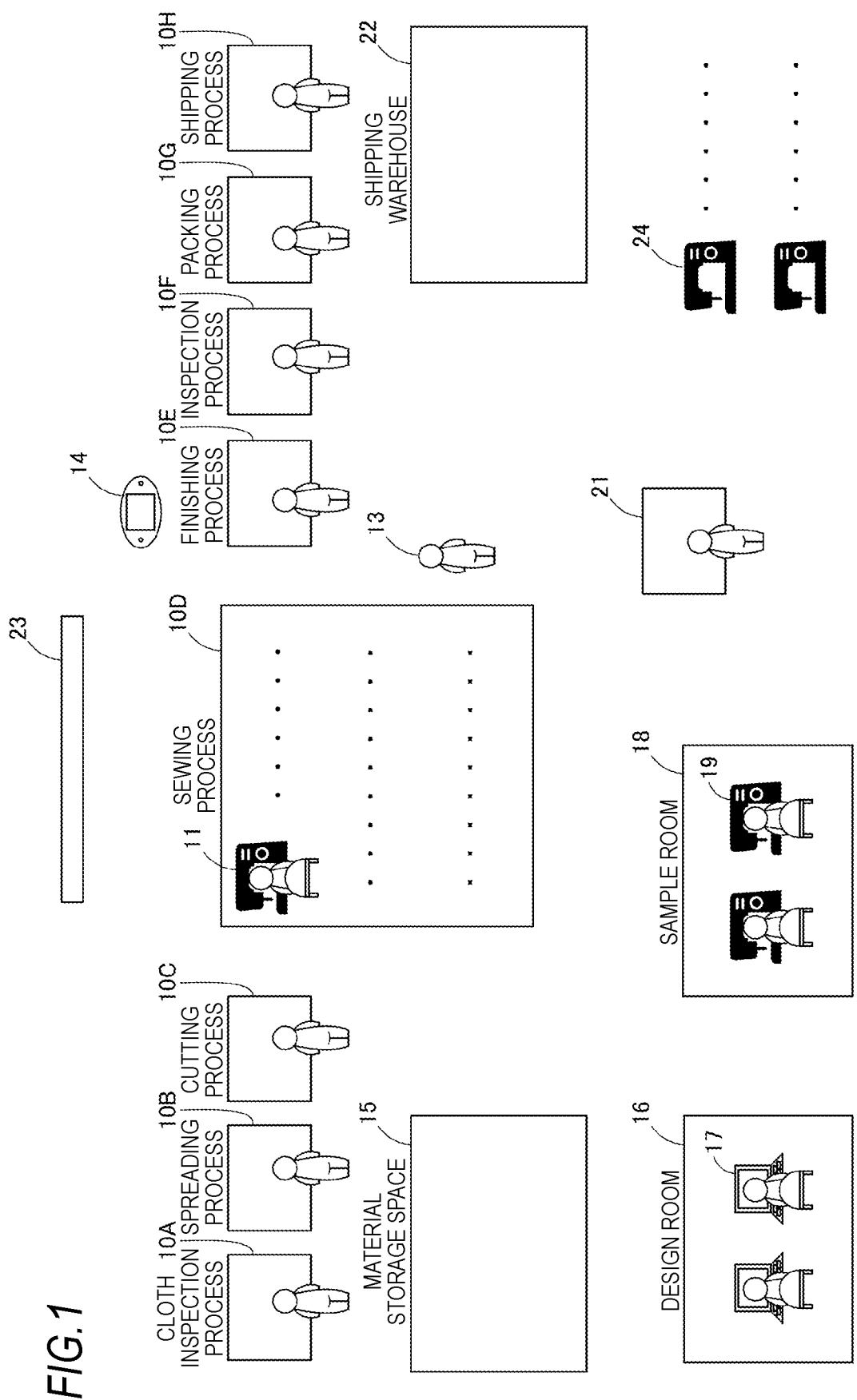
FIG. 1 is an overall schematic diagram of a sewing factory according to an embodiment of the present invention.

Hereinafter, a sewing factory that employs a monitoring system according to an embodiment of the present invention will be described with reference to the accompanying drawings. FIG. 1 is an overall schematic diagram of the sewing factory according to the embodiment. The monitoring system according to the embodiment is not limited to a sewing factory where clothing is manufactured, and may be applied to various facilities ranging from a small-scale work place to a large-scale factory.

As illustrated in FIG. 1, on the floor of a sewing factory, a manufacturing line is constructed by a cloth inspection process, a spreading process, a cutting process, a sewing process, a finishing process, an inspection process, a packing process, and a shipping process. A product such as clothing is manufactured by bringing a material into the manufacturing line and performing various processing on the material in each process. In each process, various manufacturing equipment 10 is installed, and a worker 13 who works in each piece of manufacturing equipment 10 is assigned. An automatic guided vehicle (AGV) 14 is moved between a plurality of processes, and materials and the like are unmannedly transported between the processes by the AGV 14.

In the manufacturing line, scratches and dirt on cloth to be sewn is inspected by cloth inspection equipment 10A in the cloth inspection process, and the cloth is spread out in a state in which it can be easily put in and placed in spreading equipment 10B in the spreading process. The cloth is cut into various parts by cutting equipment 10C in the cutting process, the various parts are sewn together by a plurality of sewing machines 11 by sewing equipment 10D in the sewing process, and a sewn article that has been sewn by finishing equipment 10E in the finishing process is ironed. Then, stitching, buttoning, and the like of the sewn article are inspected by the inspection equipment 10F in the inspection process, and the sewn article is packed by packing equipment 10G in the packing process and shipped as a product from shipping equipment 10H.

Further, a material storage space 15, a design room 16, a sample room 18, a work table 21, and a shipping warehouse 22 are provided around the manufacturing line. In the material storage space 15, materials such as cloth and auxiliary materials such as buttons are stored, and the quantities of materials and buttons are managed. A CAD computer 17 is installed in the design room 16, and design data of clothing is generated by the computer 17. A sewing machine 19 for a sample is installed in the sample room 18, and tension and pressing pressure of thread adjusted in the sample room 18 are set in an actual sewing machine 11. Packed products are stored in the shipping warehouse 22, and the number of products shipped is managed.

A bulletin board 23 is installed on the floor, and a production plan of the product, a communication message, and the like are displayed on the bulletin board 23. Furthermore, an empty space in the floor is a sewing machine storage space for a spare sewing machine 24, and a faulty sewing machine or an unused sewing machine is temporarily placed therein. Meanwhile, various fixed equipment such as the manufacturing equipment 10 is installed in the floor, and various moving objects such as workers and sewn articles are moving in the floor. For that reason, even if it looks around the floor, it is difficult to grasp the status of the entire floor, such as the operating status of each piece of manufacturing equipment 10, a progress status of the manufacturing line, a work status of workers, and the number of sewing machines.

For example, when a trouble occurs in the manufacturing line, it is not always possible to find a place where the trouble has occurred in a short time even if the floor is searched for. Even if a place where a trouble occurs in the manufacturing line is found, there are various causes of the trouble such as failure of the manufacturing equipment 10, human factors, and waiting for materials, and it is difficult to take an appropriate action immediately. Accordingly, in the embodiment, a monitoring system 30 (see FIG. 2) designates various pieces of equipment installed in the floor, workers in the floor, and the like as monitoring targets, and monitors the monitoring targets in real time. By grasping the status of the entire floor, it is possible to quickly cope with the trouble in the floor.

Figure 2:
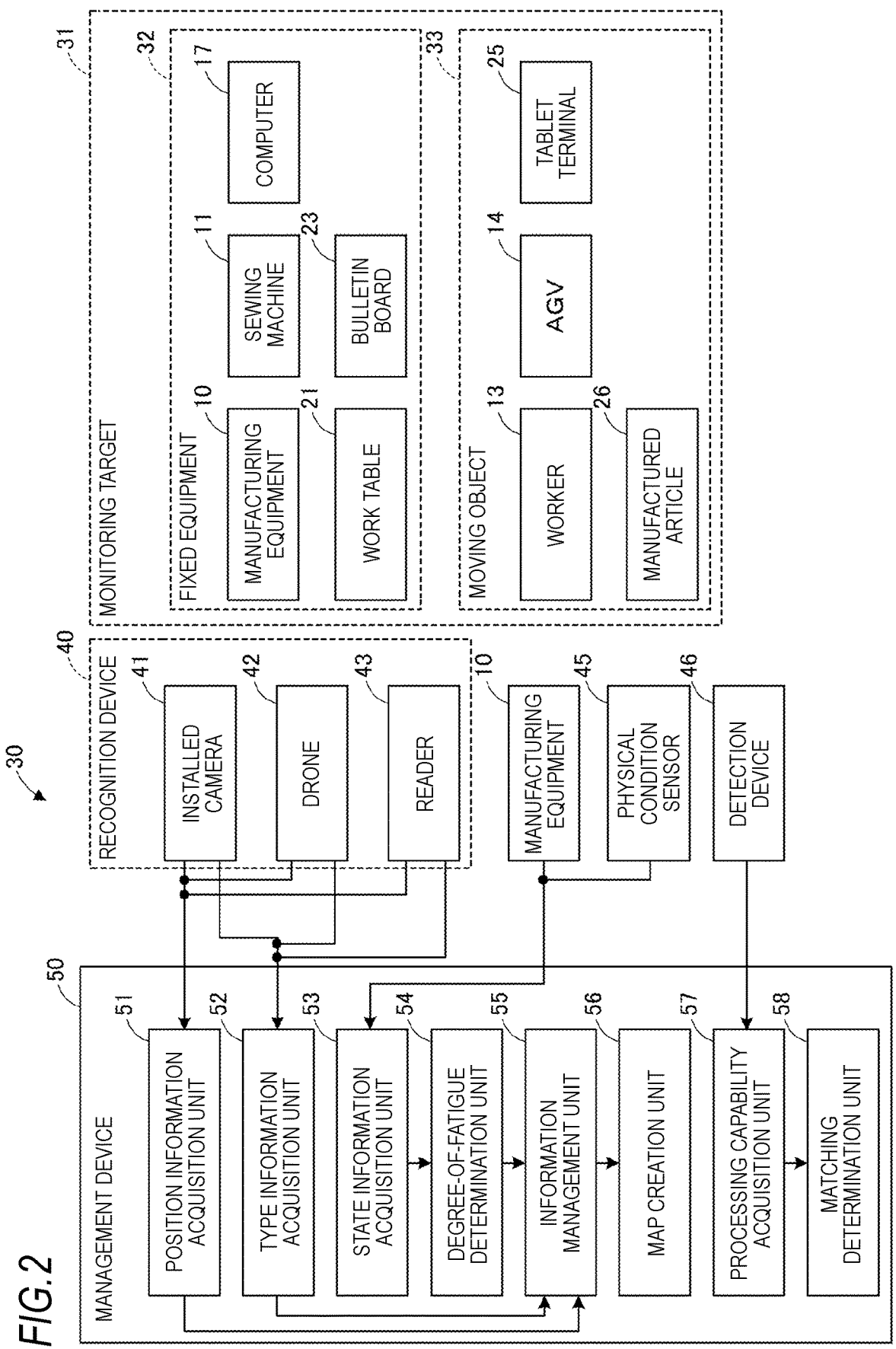
FIG. 2 is a block diagram of a monitoring system according to the embodiment.
Figure 5:
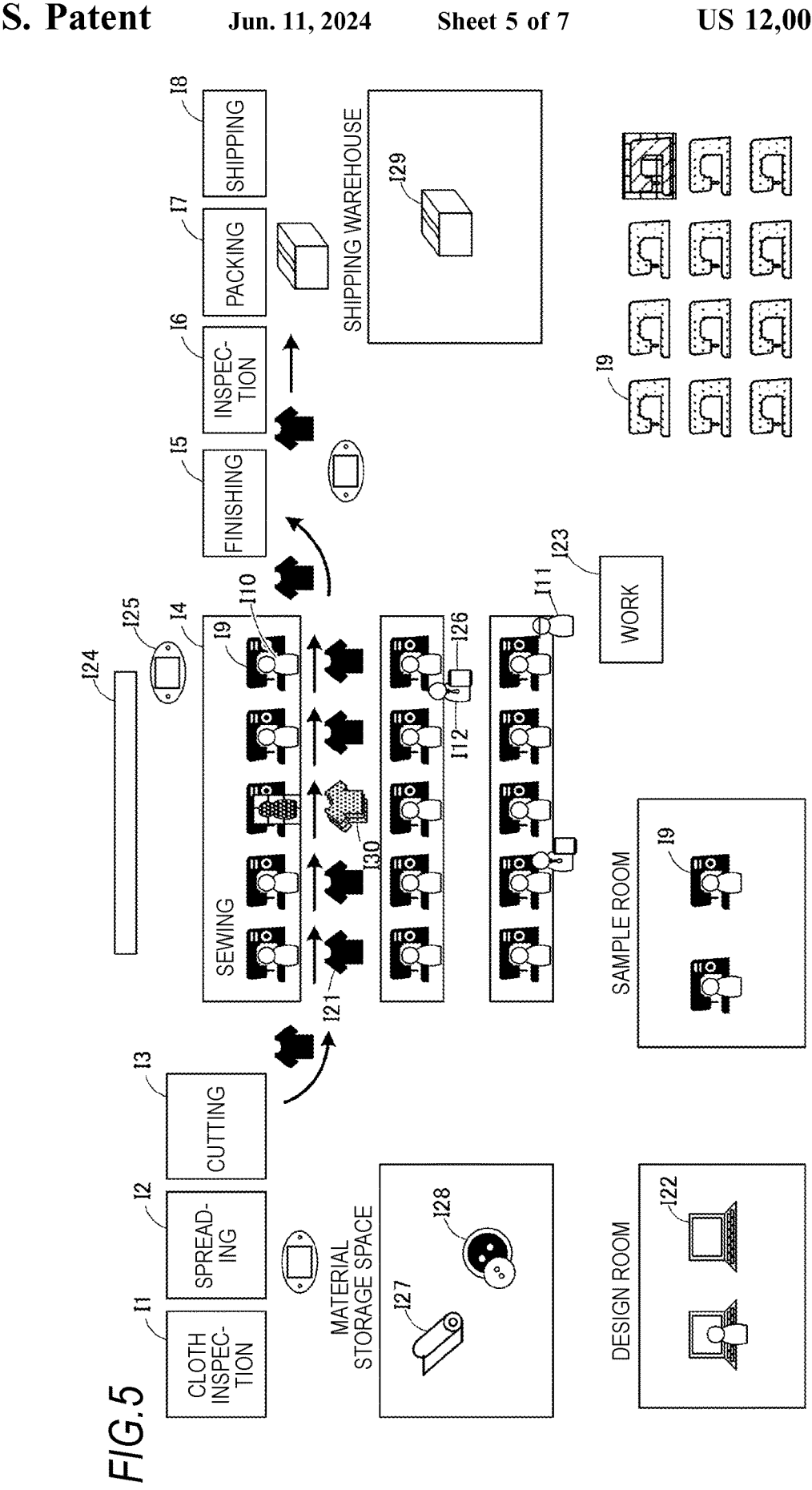
FIG. 5 is an example of a floor map according to the embodiment.

Hereinafter, a control configuration of the monitoring system will be described with reference to FIGS. 2 to 5. FIG. 2 is a block diagram of the monitoring system according to the embodiment. FIG. 3 is an example of a management table according to the embodiment. FIG. 4 is an example of an icon table according to the embodiment. FIG. 5 is an example of a floor map according to the embodiment.

As illustrated in FIG. 2, the monitoring system 30 monitors fixed equipment 32 installed in the floor and a moving object 33 moving in the floor as monitoring targets 31, and is configured by connecting various recognition devices 40 to a management device 50. Here, as the fixed equipment 32, in addition to the manufacturing equipment 10 such as cloth inspection equipment, spreading equipment, cutting equipment, sewing equipment, finishing equipment, inspection equipment, packing equipment, and shipping equipment, the sewing machine 11, the computer 17, the work table 21, and the bulletin board 23 are designated as the monitoring target 31. The worker 13 as the moving object 33, the AGV 14, the tablet terminal 25, and a manufactured article 26 are designated as the monitoring target 31.

The recognition device 40 recognizes the monitoring target 31 and outputs recognition information, and is configured by an installed camera 41, a drone 42, a reader 43, and the like. The installed camera 41 captures the monitoring target 31 in an imaging range and outputs the captured image to a management device 50 as recognition information. The drone 42 captures the monitoring target 31 in the imaging range while flying on a predetermined route, and outputs the captured image to the management device 50 as recognition information. The reader 43 is a so-called handy terminal, for example, reads a tag attached to the manufactured product 26 in each process, and outputs tag information to the management device 50 as recognition information.

The recognition device 40 may be configured by installing a camera on the AGV 14. In this case, the other monitoring target 31 is captured in the imaging range by the AGV 14 that is the monitoring target, and the captured image is output to the management device 50 as recognition information. Since the AGV 14 recognizes its moving position with a station as a reference, the AGV 14 may output its own position information to the management device 50 as recognition information. The recognition device 40 may be by configured by a beacon (not illustrated) and a receiver (not illustrated). In this case, the beacon (not illustrated) is installed in each monitoring target 31, a radio wave from the beacon is received by the receiver, and the radio wave from the beacon is output to the management device 50 as recognition information.

In the management device 50, a position information acquisition unit 51, a type information acquisition unit 52, a state information acquisition unit 53, a degree-of-fatigue determination unit 54, an information management unit 55, a map creation unit 56, and a processing capability acquisition unit 57, and a matching determination unit 58 are provided. The position information acquisition unit 51 receives recognition information from the recognition device 40 and acquires position information of the monitoring target 31 from the recognition information. For example, when the recognition information is a captured image, the position information of the recognition device 40 is estimated by matching a reference image obtained by imaging the floor in advance with the captured image of the monitoring target 31. In this case, whether or not it is the monitoring target 31 is determined according to whether or not a feature portion, a mark, or the like of the monitoring target 31 is included in the captured image.

When the recognition information is tag information, the progress status in the manufacturing line is written on a tag of the manufactured article 26 that is the monitoring target 31, and a process of the manufacturing line where the product 26 exists is acquired as the position information. When the recognition information is the radio wave from the beacon, a position where radio wave intensity from the beacon is strong is detected as the position information.

The type information acquisition unit 52 receives the recognition information from the recognition device 40 and acquires type information of the monitoring target 31 from the recognition information. For example, when the recognition information is a captured image, a type of the monitoring target 31 is determined based on the feature portion or mark of the monitoring target 31 included in the captured image. When the recognition information is the captured image, the type of the monitoring target 31 included in the captured image may be determined by learning a shape of the monitoring target 31 by deep learning. When the recognition information is the tag information or the radio wave from the beacon, the type of the monitoring target 31 is determined based on the type information included in the tag information or the radio signal.

When the monitoring target 31 is the manufacturing equipment 10, an equipment type of the manufacturing equipment 10 is acquired as the type information. The equipment type is, for example, cloth inspection equipment, spreading equipment, cutting equipment, sewing equipment, finishing equipment, inspection equipment, packing equipment, and shipping equipment. When the monitoring target 31 is the worker 13, a business type of the worker 13 is acquired as the type information. The business type is, for example, an operator, a mechanic, or a line manager. When the monitoring target 31 is the manufactured article 26, a product number of the manufactured article 26 is acquired as the type information. With this configuration, it is possible to grasp equipment layout for each equipment type, a work status of the worker for each business type, the product number of the manufacturing line, the number of sewing machines 11, and the like.

The state information acquisition unit 53 acquires operating information indicating an operating state from each piece of manufacturing equipment 10 as state information. The operating information includes, for example, the power ON, active, being stopped, power OFF, and abnormal state of the manufacturing equipment 10. When the operating state of each sewing machine 11 in the sewing equipment 10D is abnormal, the sewing machine 11 can be maintained by the mechanic or replaced with a spare sewing machine 24 placed in an empty space (see FIG. 1). The spare sewing machine 24 is not turned on, but the state information acquisition unit 53 may be notified of the state information of the spare sewing machine 24 by using energy harvesting technology (environmental power generation technology).

The state information acquisition unit 53 acquires physical condition information measured by a physical condition sensor 45 attached to the worker 13 as the state information. The physical condition information includes, for example, any one of the pulse, body temperature, and blood pressure of the worker 13. When fatigue is high, the pulse, body temperature, and blood pressure tend to be higher than a normal average, and thus, in the degree-of-fatigue determination unit 54, a degree of fatigue of the worker 13 is determined as normal, low fatigue, high fatigue, or abnormal by any one of the pulse, body temperature, and blood pressure, or any combination thereof. In this case, a plurality of threshold values corresponding to the degree of fatigue are provided, and it is determined that the physical condition of the worker 13 is abnormal when the threshold value of an extreme state is exceeded.

The physical condition information may include a brain wave, and it is also possible to grasp stress and a degree of concentration of the worker 13 by the brain wave. In addition to the physical condition information acquired from the physical condition sensor 45, the degree-of-fatigue determination unit 54 may determine the degree of fatigue in consideration of the overtime time of the worker 13 and the work time during which a machine such as the sewing machine 11 is activated. The physical condition sensor 45 is not limited to a contact sensor attached to the worker 13, but may be a non-contact sensor such as a thermography. As such, by managing the physical condition of the worker 13 with the management device 50, the work time, the work content, and the like of the worker 13 can be flexibly changed according to the physical condition.

The state information acquisition unit 53 is not limited to a configuration in which operating information of the manufacturing equipment 10 and physical condition information of the worker 13 are acquired as the state information. The state information acquisition unit 53 may be configured to acquire the state information from the monitoring target 31. For example, an operation status of the computer 17, the AGV 14, the tablet terminal 25, and the bulletin board 23, which are the monitoring targets 31 other than the manufacturing equipment 10 and the worker 13, may be acquired as the state information, or the empty status of the work table 21 in the floor may be acquired as the state information. With this configuration, it is possible to grasp an operation status of the monitoring target 31 other than the manufacturing equipment 10 and the worker 13 and the empty status of the work table 21.

The information management unit 55 manages position information and various types of information in association with each other for each monitoring target 31. When the monitoring target 31 is the manufacturing equipment 10, operating information is managed in association with the position information and the type information for each manufacturing equipment 10. By associating the operating state with the equipment layout of the manufacturing equipment 10, an installation place of the manufacturing equipment 10 whose operating state is abnormal in the floor can be grasped. When the monitoring target 31 is the worker 13, the physical condition information is managed in association with the position information and the type information for each worker 13. By associating the physical condition with the position and work of the worker 13, it is possible to grasp a work place of the worker 13 having a poor physical condition in the floor and to search for another worker 13 from the workers 13 having the same work, instead of the worker 13 having the poor physical condition.

When the monitoring target 31 is the manufactured article 26 transported on the manufacturing line, a process in the manufacturing line is acquired as the position information of the manufactured article 26, and the quantity of the manufactured articles 26 is managed for each process in the manufacturing line. With this configuration, a stagnation point in the manufacturing line can be grasped by checking the quantity of the manufactured articles 26 for each process in the manufacturing line. When the monitoring target 31 is the computer 17, the AGV 14, the tablet terminal 25, the bulletin board 23, and the work table 21, various pieces of state information may be managed in association with the position information. Furthermore, the information management unit 55 may manage a stock of materials and auxiliary materials in the material storage space and a stock of products in the shipping warehouse.

Specifically, as illustrated in FIG. 3, the information management unit 55 creates a management table. In the management table, serial numbers are registered as the identification numbers of the manufacturing equipment 10, and the position coordinates, the equipment type, and the operating state thereof are managed for each serial number. For example, it is possible to grasp that the operating state of the sewing machine installed at the position coordinates (X3, Y3) indicated by a serial number A0011 is abnormal. In the management table, employee numbers are registered as identification numbers of the worker, and the position coordinates, the business type, and the physical condition are managed for each employee number. For example, it is possible to grasp the poor physical condition of the operator at the position coordinates (X5, Y5) indicated by an employee number B0002.

The process in the manufacturing line is registered as the position information in the management table, and the quantity of the manufactured articles with each product number is managed for each process in the manufacturing line. For example, it is possible to grasp that the quantity of the manufactured articles with a product number 1 is large in the process C, and the manufacturing line is stagnant in the process C. In the management table, serial numbers are registered as identification numbers of the computer, and the position coordinates and the operation state are managed for each serial number. For example, it is possible to grasp that the computer having the position coordinates (X6, Y6) indicated by a serial number C0001 is being operated.

In the management table, serial numbers are registered as identification numbers of the AGV, and the position coordinates and the operation state are managed for each serial number. For example, it is possible to grasp that the AGV is being waited at the position coordinates (X8, Y8) indicated by a serial number D0002. In the management table, serial numbers are registered as identification numbers of the tablet terminal, and the position coordinates and the usage status are managed for each serial number. For example, it is possible to grasp that the tablet is used by the worker at the position coordinates (X10, Y10) indicated by a serial number E0002.

In the management table, serial numbers are registered as identification numbers of the bulletin board, and the position coordinates and a display state are managed for each serial number. For example, it is possible to grasp that the bulletin board is being displayed at the position coordinates (X11, Y11) indicated by a serial number F0001. In the management table, table numbers are registered as identification numbers of the work table, and the position coordinates and the empty status are managed for each table number. For example, it is possible to grasp that the work table having the position coordinates (X12, Y12) indicated by a table number G0001 is being used and the work table having the position coordinates (X13, Y13) indicated by a table number G0002 is empty.

In the management table, the quantity is managed for each material and auxiliary material placed in a stock storage space, and the quantity of the products placed in the shipping warehouse is managed for each product number. For example, the number of rolls of cloth as the material, the number of buttons, threads, and the like as auxiliary materials, and the number of clothing as the product are managed. A procurement timing of materials and auxiliary material is adjusted from the remaining number of these material and auxiliary material, and a production amount is adjusted from the remaining number of products. The quantity for each material and auxiliary material and the quantity of the product may be manually input, or may be automatically acquired from the management device in the stock storage space or the shipping warehouse.

Referring back to FIG. 2, the map creation unit 56 of the management device 50 creates a floor map in which the icon of the monitoring target 31 is arranged at a position indicated by the position information. The map creation unit 56 selects an icon corresponding to the type information and state information of the monitoring target 31 with reference to an icon table. Then, the actual position coordinates of the monitoring target 31 are converted into the position coordinates in a floor image prepared in advance, and the floor map is automatically created by displaying the icon at the position coordinates in the floor image. Since the floor map on which the icon indicating the monitoring target 31 is displayed is automatically created, the position and type of the monitoring target 31 in the floor can be intuitively grasped by visually recognizing the floor map.

Specifically, as illustrated in FIG. 4, an icon is prepared for each monitoring target in the icon table. For example, in the icon table, icons I1 to I8 of the cloth inspection equipment, spreading equipment, cutting equipment, sewing equipment, finishing equipment, inspection equipment, packing equipment, and shipping equipment are registered as the manufacturing equipment, and an icon I9 of the sewing machine is registered as a manufacturing device of the sewing equipment. Icons I10 to I12 of the operator, mechanic, and line manager are registered as workers. Furthermore, in the icon table, icons I21 to I29 of the manufactured article, computer, work table, bulletin board, AGV, tablet terminal, material, auxiliary material, and packed product are registered.

A display color of each icon is changed according to the state. For example, the display color of the icon I9 of the sewing machine is changed in five levels according to operating states of the power ON, active, being stopped, power OFF, and abnormal. The display colors of the icons I10 to I12 of the worker are changed in four levels according to the physical condition of normal, low fatigue, high fatigue, and abnormal. The displayed number of the icon I21 of the product is changed according to the quantity of the manufactured articles for each process. When the quantity of manufactured articles is within an allowable quantity for each process, the icon I21 for one manufactured article is used, and when the quantity of manufactured articles exceeds the allowable quantity for each process, an icon I30 in which a plurality of manufactured articles are stacked is used.

Then, as illustrated in FIG. 5, various icons are selected from the icon table based on the type information and the state information, and the floor map is created by arranging various icons on the floor image according to the position information of the management table. By visually recognizing the floor map, it is possible to check the positions of the manufacturing equipment, worker, manufactured article, computer, work table, bulletin board, AGV, tablet terminal, material, auxiliary material, and packed products in the floor. Therefore, it is possible to easily grasp the status of the entire floor such as the equipment layout in the floor, the work status of the worker, and the progress status in the manufacturing line.

For example, since the icon I30 in which a plurality of manufactured articles are stacked is displayed in the sewing process, it is possible to grasp that the manufacturing line is stagnant in the sewing process. In this case, it can be grasped from the display color of the icon I9 of the sewing machine that the sewing machine is operated normally, but it can be grasped from the display color of the operator icon I10 that the processing speed of the operator is reduced due to fatigue. As such, by visually recognizing the floor map, it is possible to specify a place where stagnation occurs in the manufacturing line, and further, it is possible to specify that the cause of stagnation of the manufacturing line is fatigue of the operator.

The management device continues to receive position information, type information, and state information, and the floor map is updated in real time. In this case, an update frequency of the icons may be changed between the fixed equipment and the moving object. For example, since the fixed equipment does not move in the floor, the update frequency of the fixed equipment may be reduced more than the update frequency of the moving object moving in the floor. With this configuration, a communication amount between the recognition device and fixed equipment can be sufficiently suppressed. In addition, since the floor map is updated in real time, it is possible to grasp the current status of the entire floor from the change of the icon in the floor map and take appropriate action.

Referring back to FIG. 2, the processing capability acquisition unit 57 of the management device 50 acquires the processing capability of the operator from a detection device 46. For example, the detection device 46 detects the sewing speed (motor rotation speed) when the operator uses the sewing machine 11 as the manufacturing equipment 10 as the processing capability of the operator. The detection device 46 may use a brain wave for detecting the processing capability of the operator. The stress and degree of concentration of the operator are measured from the brain wave, and the sewing speed that does not burden the operator is detected as the processing capability of the operator. With this configuration, the processing speed most suitable for the operator in the manufacturing equipment 10 can be obtained. The detection device 46 may be a device built in the manufacturing equipment 10 or a device externally attached to the manufacturing equipment 10.

The matching determination unit 58 determines matching between the processing capability of the manufacturing equipment 10 and the processing capability of the operator. In this case, the matching determination unit 58 determines matching based on whether or not a deviation quantity between the maximum processing capability of each piece of manufacturing equipment 10 and the processing capability of the operator is within an allowable range. If the deviation quantity between the maximum processing capability of the manufacturing equipment 10 and the processing capability of the operator is within the allowable range, it is determined that the manufacturing equipment 10 and the operator are sufficiently capable of extracting each other's processing capability. If the deviation quantity between the maximum processing capability of the manufacturing equipment 10 and the processing capability of the operator is outside the allowable range, it is determined that the processing capability of either the manufacturing equipment 10 or the operator cannot be sufficiently extracted.

For example, if the maximum sewing speed of the sewing machine 11 is 8500 [sti/min] and the allowable range is set to ±1000 [sti/min], it is determined that the sewing machine 11 is matched to an operator having a sewing speed of 8000 [sti/min]. On the other hand, it is determined that the sewing machine 11 is mismatched to an operator having a sewing speed of 6000 [sti/min]. For that reason, another sewing machine 11 with a suppressed maximum sewing speed is assigned to an operator who is determined not to make use of the processing capability of the sewing machine 11. By activating the sewing machine 11 at a sewing speed that matches the skill of the operator, the operator can comfortably work.

The maximum processing capability of the manufacturing equipment 10 and the processing capability of the operator may be reflected on the icons of the floor map. For example, the display color of the icon may be changed according to the maximum sewing speed of the manufacturing equipment 10, or the display color of the icon may be changed according to the sewing speed of the operator. With this configuration, by visually recognizing the floor map, it is possible to grasp whether or not the processing capability of the manufacturing equipment 10 and the processing capability of the operator match. When the processing capability of the manufacturing equipment 10 and the processing capability of the operator are mismatched, the operator can be rearranged while visually recognizing the floor map.

The position information acquisition unit 51, the type information acquisition unit 52, the state information acquisition unit 53, the degree-of-fatigue determination unit 54, the information management unit 55, the map creation unit 56, the processing capability acquisition unit 57, and the matching determination unit 58 of the management device 50 are configured by a processor that executes various processing, a memory, and the like. The memory is configured by one or more storage media such as a read only memory (ROM) and a random access memory (RAM) according to the application, and stores various types of programs such as a map creation method and a matching determination method in addition to a control program that comprehensively controls the entire apparatus.

Figure 6:
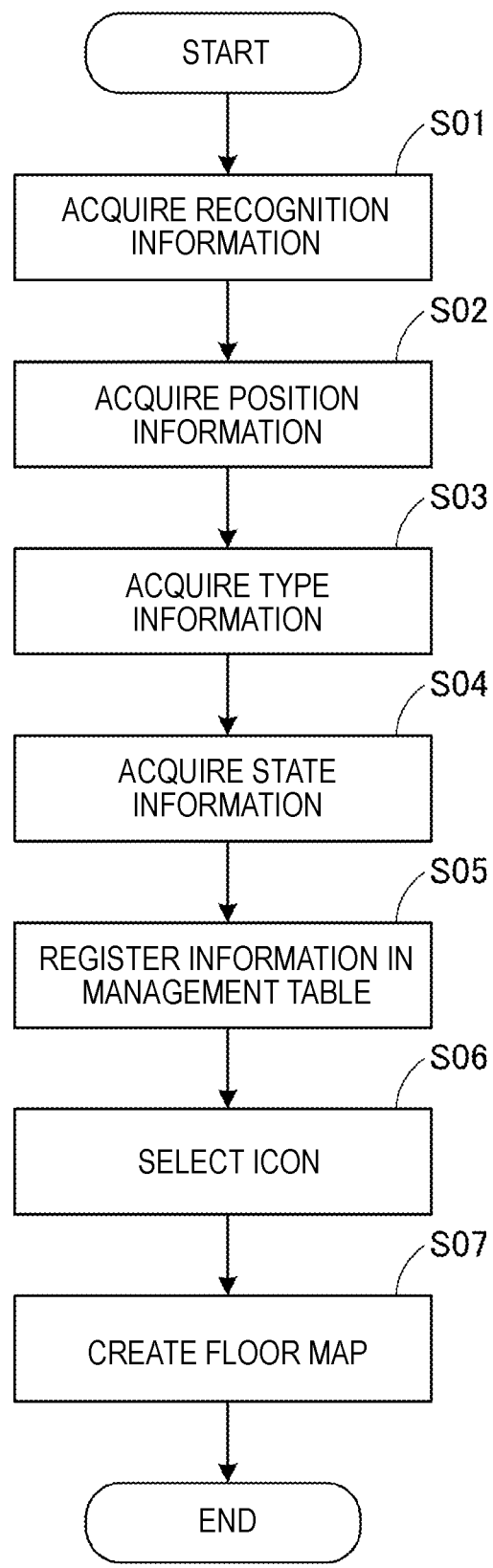
FIG. 6 is a flowchart of a map creation method according to the embodiment.
Figure 7:
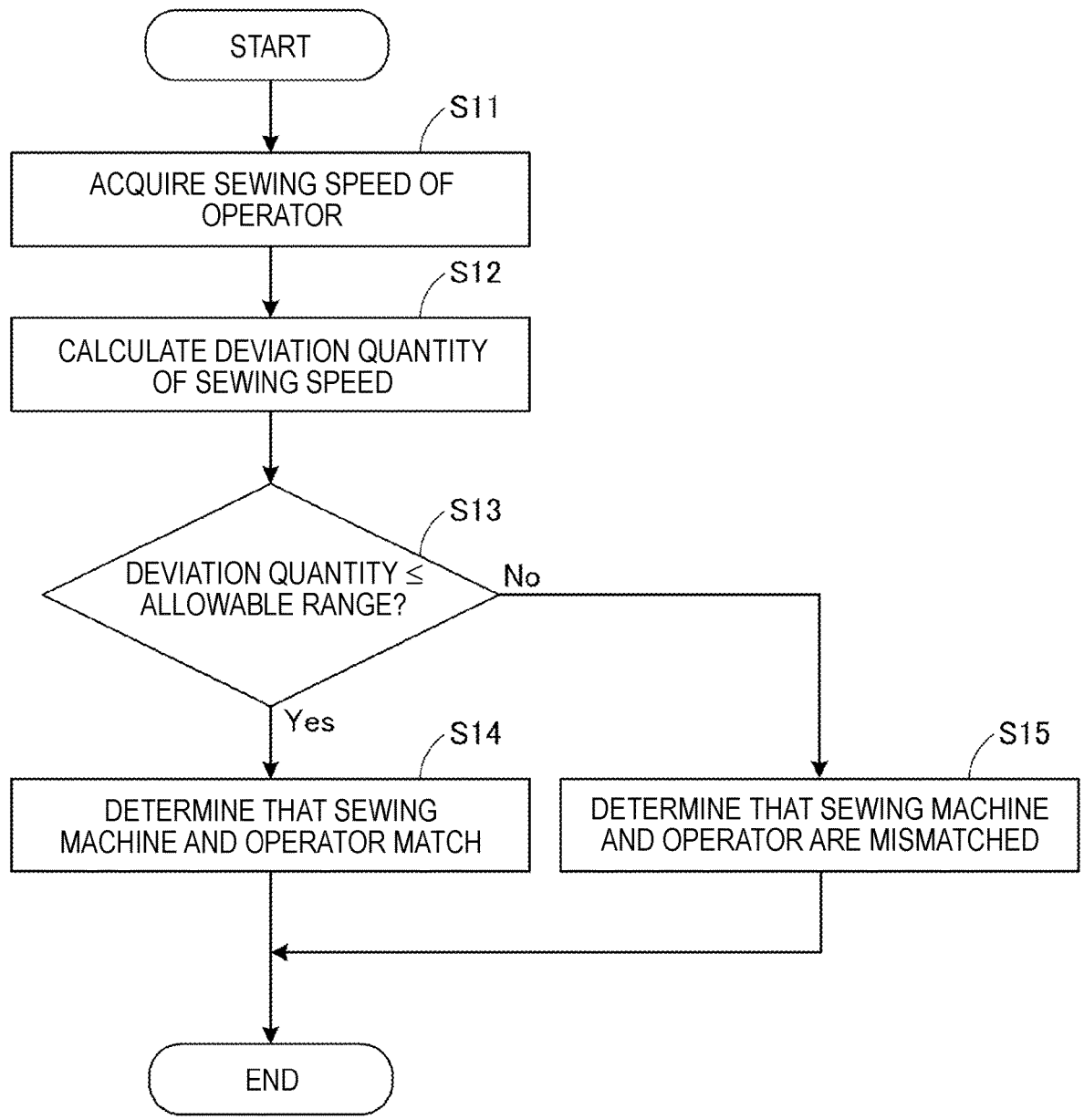
FIG. 7 is a flowchart of a matching determination method according to the embodiment.

Hereinafter, a flowchart of a map creation method and a flowchart of a matching determination method according to the embodiment will be described with reference to FIGS. 6 and 7. FIG. 6 is the flowchart of the map creation method according to the embodiment. FIG. 7 is the flowchart of the matching determination method according to the embodiment. For convenience of description, description will be made using the reference numerals in FIG. 2 as appropriate. Although a sewing machine is exemplified as manufacturing equipment in FIG. 7, the manufacturing equipment is not limited to the sewing machine.

First, the map creation method will be described. As illustrated in FIG. 6, recognition information of the monitoring target 31 output from the recognition device 40 is acquired by the management device 50 (step S01). For example, a captured image of the monitoring target 31 output from the installed camera 41 or the drone 42 is acquired as the recognition information, and tag information of the manufactured article 26 output from the reader 43 is acquired as the recognition information. Next, the position information of the monitoring target 31 is acquired from the recognition information by the position information acquisition unit 51 (step S02). For example, the position information of the monitoring target 31 is acquired from the captured image by a camera image positioning method, and the process in which the manufactured article 26 exists is acquired as the position information from the tag information.

Next, the type information of the monitoring target 31 is acquired from the recognition information by the type information acquisition unit 52 (step S03). For example, the type of the monitoring target 31 is determined from the feature portion and the like included in the captured image, and the type of the manufactured article 26 is determined from the product number included in the tag information. Next, state information is acquired from the monitoring target 31 by the state information acquisition unit 53 (step S04). For example, the operating state is acquired from the manufacturing equipment 10 as state information, and the physical condition of the worker 13 is acquired from the physical condition sensor 45 as the state information. A processing order of steps S02 to S04 can be changed, and processing of steps S02 to S04 may be performed simultaneously.

Next, various pieces of information are registered in the management table for each monitoring target 31 by the information management unit 55 (step S05). For example, the position information, the type information, and the operating information are managed in association with each piece of manufacturing equipment 10, the position information, the type information, and the physical condition information are managed in association with each worker 13, and the quantity of the manufactured articles 26 is managed for each process in the manufacturing line. Next, the map creation unit 56 selects an icon from the icon table based on the type information and operating information of the monitoring target 31 (step S06). For example, the icon of the sewing machine 11 which is in active is selected, and the icon of the worker 13 at normal time is selected.

Then, the map creation unit 56 creates a floor map by arranging various icons on the floor image according to the position information of the monitoring target 31 (step S07). With this configuration, the equipment layout is displayed on the floor map, and the work status of the worker 13 and the progress status of the manufacturing line are displayed. In this way, the entire floor can be monitored in real time from the icons displayed on the floor map. For example, it is possible to grasp the manufacturing equipment 10 with an abnormal operating state, the worker 13 with poor physical condition, and the stagnation status of the manufacturing line from the floor map, and take appropriate action according to the status.

Subsequently, the matching determination method will be described. As illustrated in FIG. 7, the processing capability acquisition unit 57 acquires the processing capability of the operator (step S11). In this case, the sewing speed when the operator uses the sewing machine 11 is acquired as the processing capability. A brain wave of the operator may be measured and a sewing speed that does not cause stress on the operator may be used as the processing capability. Next, the deviation quantity between the maximum sewing speed of the sewing machine 11 which is set in advance and the sewing speed of the operator is calculated (step S12). The maximum sewing speed of the sewing machine 11 may be set in the management device 50 in advance, or may be acquired from the sewing machine 11 by the processing capability acquisition unit 57.

Next, the matching determination unit 58 determines whether or not the deviation quantity between the maximum sewing speed of the sewing machine 11 and the sewing speed of the operator is within the allowable range (step S13). When it is determined that the deviation quantity is within the allowable range (Yes in step S13), it is determined that the processing capability of the sewing machine 11 and the processing capability of the operator match (step S14). On the other hand, when it is determined that the deviation quantity is outside the allowable range (No in step S13), it is determined that the processing capability of the sewing machine 11 and the processing capability of the operator are mismatched (step S15). By assigning a high-skilled operator to a high-performance sewing machine based on this determination result, productivity of the entire manufacturing line can be improved.

In the monitoring system 30 according to the embodiment, the position, type, and state of the manufacturing equipment 10, the worker 13, the manufactured article 26, the computer 17, the work table 21, the bulletin board 23, the AGV 14, the tablet terminal 25, the material, the auxiliary material, packed product, and the like in the floor are specified as the monitoring targets 31. Therefore, the status of the entire floor can be easily grasped from the equipment layout of the manufacturing equipment 10, the work status of the worker 13, the progress status of the manufacturing line, and the like.

In the embodiment, the configuration in which the monitoring system is applied to the sewing factory is described, but the present invention is not limited thereto. The monitoring system can be applied to a facility capable of monitoring either fixed equipment installed in the floor or a moving object moving in the floor. For example, the present invention can be applied to other manufacturing facilities, commercial facilities, public facilities, housing facilities, tourist facilities, power generation facilities, research facilities, medical facilities, parking facilities, and warehouse facilities.

In the embodiment, the monitoring system monitors both the fixed equipment and the moving object as the monitoring target, but the present invention is not limited thereto. The monitoring system may be configured to monitor at least one of the fixed equipment and the moving object as the monitoring target. For example, the monitoring system may monitor only the fixed equipment, or may monitor only the operating equipment.

In the embodiment, various manufacturing equipment, computers, work tables, and bulletin boards are exemplified as the fixed equipment, but the present invention is not limited thereto. The fixed equipment is not particularly limited as long as it is the monitoring target installed in the floor.

In the embodiment, the worker, the AGV, the tablet terminal, and the manufactured article are exemplified as the moving objects, but the present invention is not limited thereto. The moving object is not particularly limited as long as it is the monitoring target that moves within the floor.

In the embodiment, an installed camera, a device such as a drone that monitors using a camera, and a device such as a reader that reads and monitors a tag of a manufactured article are exemplified as the recognition device, but the present invention is not limited thereto. The recognition device may recognize the monitoring target and output the recognition information. For example, the recognition device may be a thermography for recognizing the monitoring target by heat distribution, or a radar device for recognizing the monitoring target by millimeter wave radar. The recognition device may be a positioning device that recognizes the monitoring target from a positioning result of a sound positioning method using ultrasonic waves with high directivity, a visible light positioning method using visible light from an LED light source, and a pedestrian autonomous positioning method using an acceleration sensor, a gyro sensor, a geomagnetic sensor, and the like.

In the embodiment, the configuration in which the position information of the monitoring target is acquired by the management device is adopted, but the present invention is not limited thereto. The position information may be acquired from the recognition information by the monitoring target and output to the management device.

In the embodiment, the configuration in which the type information of the monitoring target is acquired by the management device is adopted, but the present invention is not limited thereto. The type information may be acquired from the recognition information by the monitoring target and output to the management device.

In the embodiment, the configuration in which the state information of the monitoring target is acquired by the management device is adopted, but the present invention is not limited thereto. The state information may be acquired by the monitoring target and output to the management device.

In the embodiment, the operator, the mechanic, and the line manager are exemplified as the business type of the worker, but the present invention is not limited thereto. The business type of the worker may be business related to any work in the floor, and may include, for example, a CAD programmer, a system engineer, and a management staff.

In the embodiment, the pulse, the body temperature, the blood pressure, the brain wave, and the like are exemplified as physical condition information, but the present invention is not limited thereto. The physical condition information may be information that can grasp the physical condition of the worker, and may include, for example, a respiratory rate. The physical condition of the worker may be determined by appropriately combining the parameters described above.

In the embodiment, the degree-of-fatigue determination unit determines the degree of fatigue of the worker in four levels of normal, low fatigue, high fatigue, and abnormal by any one of the pulse, body temperature, and blood pressure, or any combination thereof, but the present invention is not limited thereto. The degree-of-fatigue determination unit may be configured to determine the degree of fatigue of the worker based on the physical condition information, and the degree of fatigue of the worker may be determined by any method.

In the embodiment, the manufacturing line is not limited to one that produces clothing. The manufacturing line only needs to produce products. For example, electronic devices, foods, and daily necessities may be produced in the manufacturing line.

In the embodiment, the management device may be configured to collect at least position information of the monitoring target. Accordingly, the management device may not perform physical condition management of the worker, quantity management of the manufactured article, creation of the floor map, and matching determination between the processing capability of the manufacturing equipment and the processing capability of the operator.

The program according to the embodiment may be stored in a recording medium. The recording medium is not particularly limited, but may be a non-transitory recording medium such as an optical disk, a magneto-optical disk, or a flash memory.

Although the embodiment and modification example of the present invention are described, as another embodiment of the present invention, the embodiment and modification example described above may be combined in whole or in part.

The embodiments of the present invention are not limited to the embodiment and modification example described above, and various changes, substitutions, and modifications may be made thereto in a range without departing from the gist of the technical idea of the present invention. Furthermore, if the technical idea of the present invention can be realized in another way by technological advancement or another derived technique, the present invention may be implemented using that method. Accordingly, the claims cover all embodiments that can be included within the scope of the technical idea of the present invention.

Furthermore, in the embodiment, the monitoring system that monitors at least one of fixed equipment installed in a floor and a moving object moving in the floor, the fixed equipment and moving object being monitoring targets, and includes a recognition device that recognizes the monitoring target and outputs recognition information and a management device that collects position information of the monitoring target from the recognition information is provided. Therefore, the position of the fixed equipment installed in the floor or the position of the moving object moving in the floor as the monitoring target is specified. Therefore, the status of the entire floor can be easily grasped from the equipment layout in the floor, the moving status of the moving object, and the like.

As described above, the present invention has an effect that the status of the entire floor can be easily grasped, and is particularly useful for a monitoring system in a clothing sewing factory.

What is claimed is:

1. A monitoring system for monitoring at least one of fixed equipment installed in a floor of a sewing factory and/or a sewing work place and a moving object moving in the floor, the fixed equipment and moving object being monitoring targets, the monitoring system comprising:
   a recognition device that recognizes a monitoring target of the monitoring targets and outputs recognition information; and
   a management device that collects position information of the monitoring target from the recognition information, that receives a floor image of the floor, and that creates a floor map by arranging an icon corresponding to the monitoring target on the floor image,
   wherein a manufacturing line is constructed in the floor, and the moving object including a manufactured article transported on the manufacturing line is set as the monitoring target,
   the icon being selected based on type information of the monitoring target and state information of the monitoring target, the icon including an indicator that is changed based on the state information, the state information including at least a quantity of manufactured articles for each process of the manufacturing line, the indicator of the at least one icon changed on the quantity of manufactured articles, the icon is arranged at a position indicated by the position information, and the icon selected when the manufactured articles satisfy an allowable condition is different from the icon selected when the manufactured articles do not satisfy the allowable condition,
   the moving object further including a worker being set as the monitoring target,
   the management device collects position information of the monitoring target from the recognition information,
   the management device receives a floor image of the floor,
   the management device acquires a business type of the worker as type information, the business type of the worker being one of an operator, a mechanic, a line manager, a CAD programmer, a system engineer, and a management staff,
   the management device creates a second icon corresponding to the worker set as the monitoring target on the floor image based on the business type of the worker,
   the management device acquires physical condition information of the worker from a physical condition sensor,
   the management device determines a degree of fatigue of the worker based on the physical condition information,
   the management device displays the second icon including an indicator that is changed based on the degree of fatigue of the work,
   the fixed equipment including a sewing machine installed on the floor and the moving object including an operator working on the sewing machine are set as the monitoring target,
   the management device includes a processing capability acquisition unit that:
     determines a processing capability of the sewing machine, the processing capability of the sewing machine includes a maximum sewing speed of the sewing machine; and
     acquires a processing capability of the operator using the sewing machine, the processing capability of the operator using the sewing machine includes the sewing speed used by the operator using the sewing machine, and
   the management device further includes a matching determination unit that:
     determines matching between the processing capability of the sewing machine and the processing capability of the operator,
     when the deviation quantity between the processing capability of the sewing machine and the processing capability of the operator is within the allowable range, it is determined that the sewing machine and the operator are capable of extracting each other's processing capability, and
     when the deviation quantity between the processing capability of the sewing machine and the processing capability of the operator is outside the allowable range, it is determined that the processing capability of either the sewing machine or the operator cannot be extracted; and
     assigning another sewing machine with a suppressed maximum sewing speed to the operator when the deviation quantity between the processing capability of the sewing machine and the processing capability of the operator is outside the allowable range.

2. The monitoring system according to claim 1, wherein the management device includes:
   a position information acquisition unit that acquires the position information of the monitoring target from the recognition information,
   a type information acquisition unit that acquires the type information of the monitoring target from the recognition information, and
   an information management unit that manages the position information and the type information in association with each other for each monitoring target.

3. The monitoring system according to claim 2, wherein the management device includes a state information acquisition unit that acquires the state information from the monitoring target, and manages the state information in association with the position information and the type information for each monitoring target.

4. The monitoring system according to claim 3, wherein the fixed equipment including manufacturing equipment installed in the floor is set as the monitoring target, and the management device acquires an equipment type of the manufacturing equipment as the type information by the type information acquisition unit.

5. The monitoring system according to claim 4, wherein the management device acquires operating information indicating an operating state from the manufacturing equipment by the state information acquisition unit, and manages the operating information in association with the position information and the type information for each manufacturing equipment by the information management unit.

6. The monitoring system according to claim 3, wherein the moving object further including a second worker who walks around the floor is set as the monitoring target, and the management device acquires a business type of the second worker as the type information by the type information acquisition unit, the business type of the second worker different from the business type of the worker, the management device creates a third icon corresponding to the second worker set as the monitoring target on the floor image based on the business type of the second worker, the second icon different from the third icon, the management device acquires physical condition information of the second worker from a physical condition sensor, the management device determines a degree of fatigue of the second worker based on the physical condition information, and the management device displays the third icon including an indicator that is changed based on the degree of fatigue of the work.

7. The monitoring system according to claim 6, wherein the management device acquires the physical condition information of the second worker from the physical condition sensor by the state information acquisition unit, and manages the physical information in associated with the position information and the type information for each worker by the information management unit.

8. The monitoring system according to claim 2, wherein the recognition device is a reader that reads a tag attached to the manufactured article and outputs tag information as the recognition information, and the management device acquires, as position information, the process of the manufacturing line where the manufactured article exists from the tag information by the position information acquisition unit, and manages the quantity of the manufactured article for each process of the manufacturing line by the information management unit.

9. The monitoring system according to claim 3, wherein the management device continues to acquire the position information of the monitoring target, continues to acquire the type information of the monitoring target, continues to acquire the state information from the monitoring target, and updates, in real time, the floor map of the floor in which the icon corresponding to the monitoring target is continuously arranged at positions indicated by the continuously acquired position information.

* * * * *